May 17, 1955 S. J. STOLL 2,708,466
MITER BOX WITH HORIZONTAL AND VERTICAL PIVOTS
Filed Oct. 1, 1948 3 Sheets-Sheet 1

INVENTOR.
Samuel J. Stoll

May 17, 1955  S. J. STOLL  2,708,466
MITER BOX WITH HORIZONTAL AND VERTICAL PIVOTS
Filed Oct. 1, 1948  3 Sheets-Sheet 2
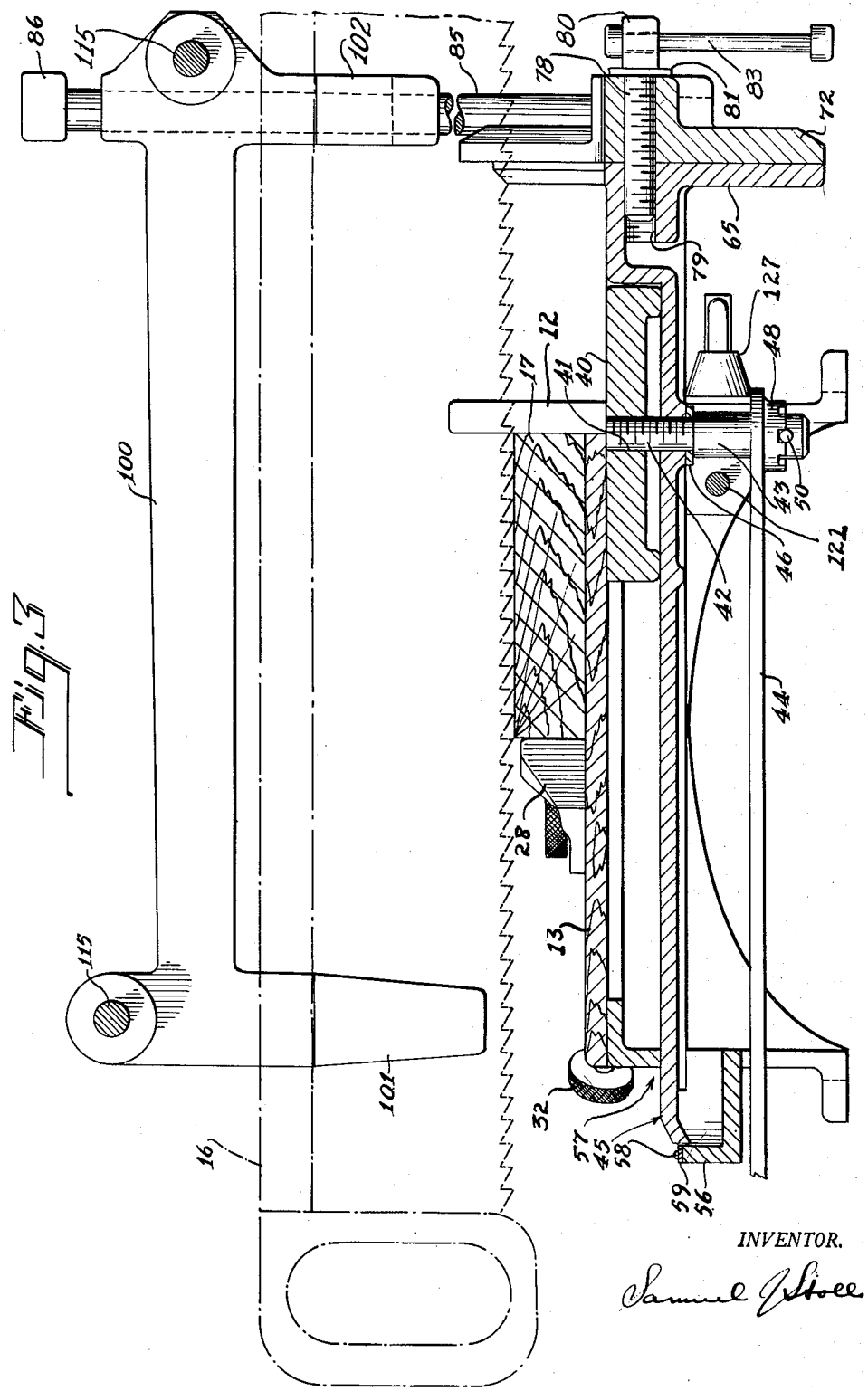
INVENTOR.
Samuel J. Stoll

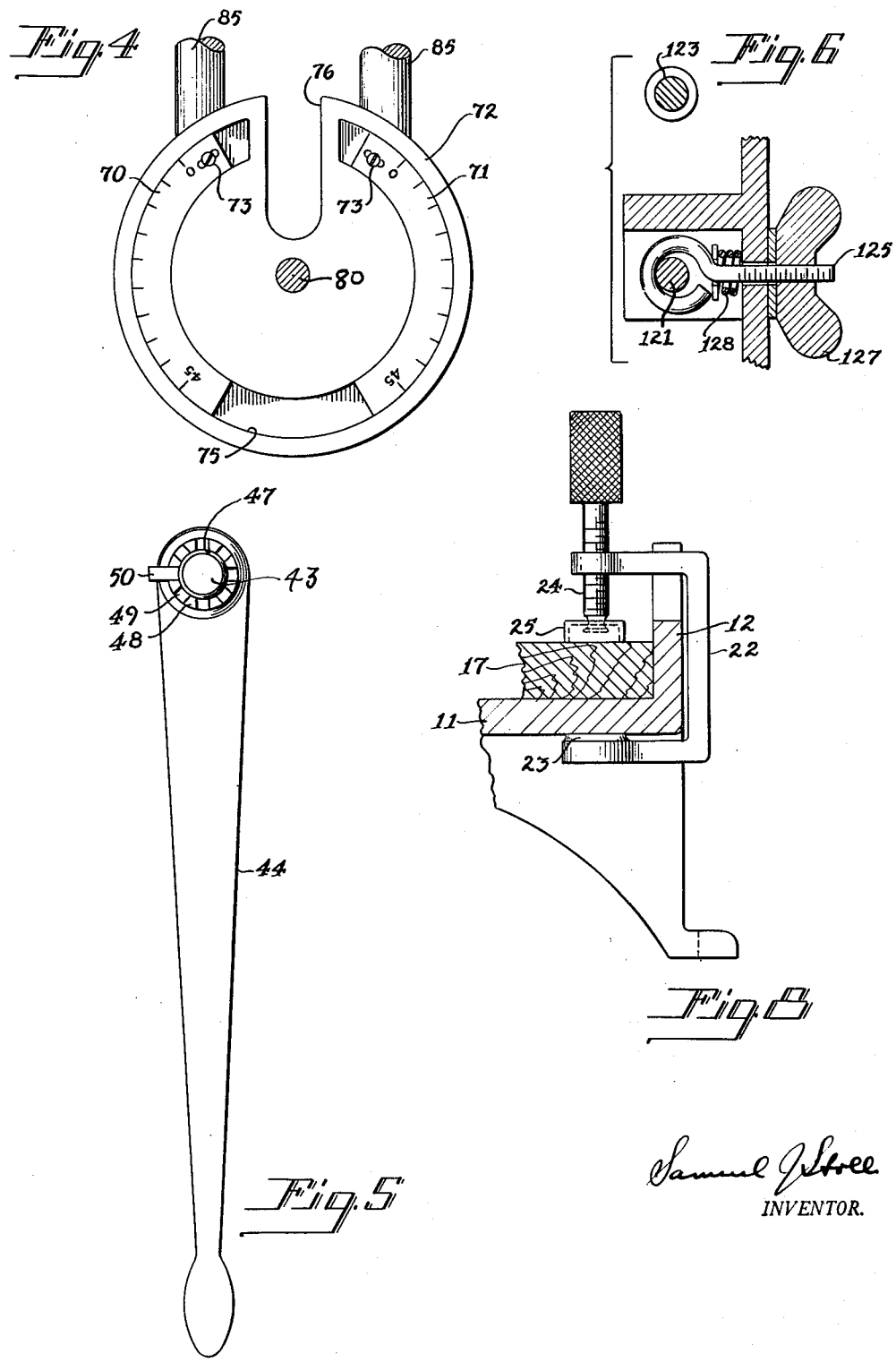

United States Patent Office
2,708,466
Patented May 17, 1955

2,708,466

MITER BOX WITH HORIZONTAL AND VERTICAL PIVOTS

Samuel J. Stoll, Flushing, N. Y.

Application October 1, 1948, Serial No. 52,227

5 Claims. (Cl. 143—89)

This invention relates to a miter box whose saw guides pivot on vertical and horizontal axes.

Miter boxes of this general character have heretofore been devised and patented. They have however, been unsatisfactory in the following respects: Their saw guide clamps have been wholly inadequate. Their work clamps have been unsatisfactory and in many cases work clamps were totally lacking. Their dials have been inaccurate and suitable adjusting means to set the dials have not been provided. In many cases the saw guides have been of the closed front type, thereby necessarily limiting the capacity of the miter box to work of relatively narrow widths.

It is accordingly the principal object of the present invention to provide a miter box of the general character described which includes adequate clamping means for the saw guides and for the work, accurate dials for setting the saw guides, these dials being adjustable so that they themselves might accurately be set, and open front saw guides which are adapted to accommodate work of virtually any width, limited solely by the effective length of the saw.

In the present device three quick-acting clamps are provided: The first locks the saw guides on their vertical pivot; the second locks the saw guides on their horizontal pivot; and the third locks the work in operative position. Each of these clamps is not only quick-acting but it is also positive in its clamping action. The present device is provided with two large, legible dials, one relating to the vertical pivot and the other to the horizontal pivot. These dials may quickly and accurately be read and used to set the saw guides on both pivots. Each dial is individually adjustable so that it may be set accurately for virtually precision work. The saw guides with which the present device is provided are widely spaced to guide the saw accurately during the cutting operation. They are of the open front type to enable the miter box to accommodate work of great width. They are also adapted for use in conjunction with a hand saw as well as a miter saw.

A preferred embodiment of this invention is shown in the accompanying drawing in which:

Fig. 3 is a vertical section on the line 3—3 of Fig. 1;

Fig. 4 is a front view of the dial which relates to the horizontal pivot;

Fig. 5 is a view of the lever which actuates the clamp on the vertical pivot;

Fig. 6 is a fragmentary section on the line 6—6 of Fig. 1, showing a clamp on the length gauge;

Fig. 8 is a side view of another type of work clamp for which the present miter box is suited, said clamp being shown in operative position with respect to a piece of work on the miter box, said work and said miter box being shown in fragmentary, vertical section.

Figures 1, 2, 7:
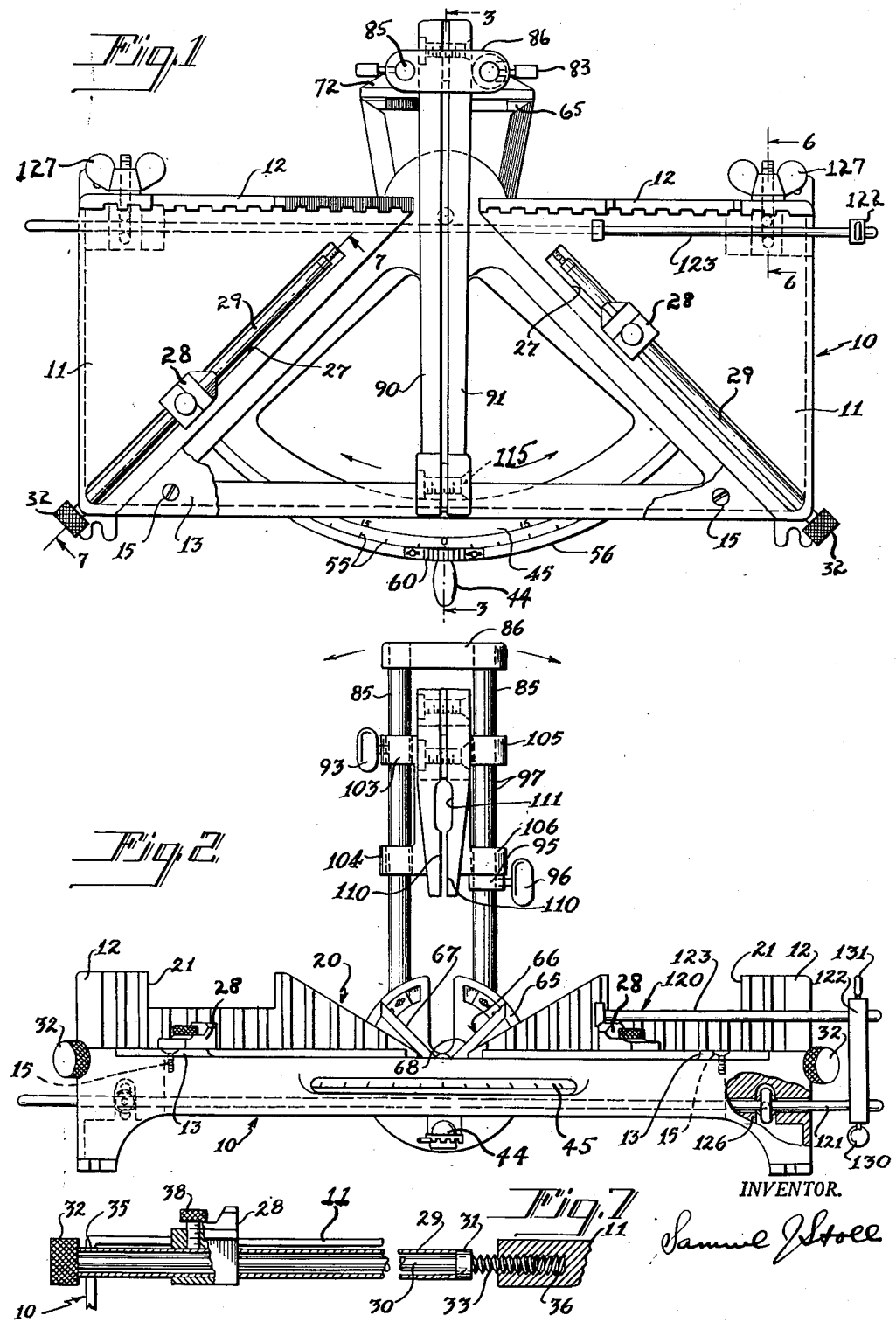
Fig. 1 is a plan view thereof.
Fig. 2 is a front view.
Fig. 7 is a section on the line 7—7 of Fig. 1, showing one of the work clamps.

The invention herein claimed includes a base 10 which has a pair of table portions 11 and a pair of backstops 12. Each of the two table portions 11 has the shape, substantially, of a right angle triangle. Between these two table portions is a substantially triangular-shaped board 13 whose top surface lies on a common plane with table portions 11. Board 13 is held in place on base 10 by means of screws 15. It will be appreciated therefore that board 13 is removable for replacement purposes. All of base 10 including its table and backstop portions is made of a single iron or aluminum casting. Board 13 however, is made of wood or similarly soft material. It will be understood that the teeth of saw 16, after passing through work 17 will engage board 13 only. Hence the use of wood or a similar material for board 13, to avoid injuring the saw teeth.

A V-shaped space 20 is provided between backstops 12. It will be seen from the description of this miter box that this V-shaped space is provided to accommodate the saw when the saw guides are pivoted on their horizontal pivot. By the same token board 13 is triangular-shaped to receive the saw in any of its angular positions about the vertical pivot of the saw guides.

Each backstop or backrest 12 has a cut-out 21 formed therein. These cut-outs perform two functions: They accommodate the saw guide supports when the saw guides are pivoted to their extreme positions on their vertical and horizontal pivots, and they also accommodate C clamps 22. It will be seen in Fig. 8 that the bottom of each table portion 11 is flat, lying on a plane which is parallel to the plane of its top surface. The bottom of each table portion is therefore suitably engageable by the fixed jaw 23 of C clamp 22. Screw 24 and the movable jaw or contact member 25 mounted thereon may be passed into operative position with respect to work 17, through cut-out 21. It will be evident from Fig. 8 therefore that C clamps 22 may be used to clamp the work to tables 11 preparatory to the cutting operation. It will also be understood that, when desired, the same C clamps may be used to clamp the work against the backstops. The determining factor is, of course, the shape and size of the work. This ability of the miter box to make use of a C clamp to hold the work in operative position is one of its principal features. It affords one of the most efficient work holding means yet devised.

Alternative to the clamping construction above described, or additional thereto, is the clamping construction which is best shown in Fig. 7. Each table portion 11 has a diagonally extending slot or groove 25 formed therein, parallel to the line of juncture between said table portion and board 13. Slidably mounted in each said slot 27 is a dog or clamping member 28. It will be seen in Fig. 7 that this dog 28 is slidably mounted on a sleeve 29 which is rotatably mounted on a rod 30. A collar 31 at one end of said sleeve and a knob 32 at the other end, prevent axial movement of said sleeve relative to said rod 30. Said knob and said collar are of course, fixedly mounted on rod 30 and it will be noted that said rod is provided with a screw threaded portion 33 adjacent its collar 31, and opposite its knob 32. Axially aligned holes are formed in base 10 as is best shown in Fig. 7. These holes are on a line which lies immediately below and which is parallel to slot 27. The front hole 35 accommodates sleeve 29 and the back hole 36 is tapped to accommodate screw threaded portion 33 of rod 30. It will be seen in Fig. 1 that each front hole 35 is formed in a front corner of the base and each tapped rear hole is formed in the back of the base, and more particularly in a table portion 11 or in a boss formed under said table portion. A thumb screw 38 is mounted in dog 28 and it will be seen that said thumb screw extends through said dog to engage sleeve 29. It is thus possible to clamp dog 28 in any desired position with respect to sleeve 29.

To operate the clamp construction shown in Fig. 7, dog 28 is moved manually along slot 27 until it abuts work 17. See Fig. 3. Thumb screw 38 is then tightened upon sleeve 29 and knob 32 is then turned until dog 28 clamps tightly against work 17. This latter clamping action results from the fact that turning the knob causes the rod, and more especially its threaded end portion, to turn in tapped hole 36. This causes longitudinal movement of the rod and hence of the sleeve which is mounted thereon, as well as of the dog which is clamped to the sleeve. Depending upon the coarseness of the screw threads on the rod and in the tapped hole, only a small fraction of a turn is needed to cause the dog to clamp tightly upon the work. To release the clamp from the work, knob 32 is turned in the opposite direction and thumb screw 38 is loosened. This frees the work for removal from the miter box.

A circular, downwardly extending boss 40 is formed on base 10. The center of the boss coincides with the vertical center of the base, on a line which lies on a common plane with the operative or front surface of the two backstop portions 12. A tapped hole 41 is provided in the center of said boss, said hole extending on a perfectly vertical line. A clamp screw 42 projects upwardly into said tapped hole and it will be seen in Fig. 3 that said clamping screw has an enlarged portion 43 on which a lever or handle 44 is rotatably mounted. Rotatably mounted on the reduced portion of clamp screw 43 is a swivel arm 45. The upper end of the enlarged portion of the clamping screw comprises an annular shoulder which supports the swivel arm. A washer 46 is interposed between said annular shoulder and the swivel arm to lessen friction between the two when relative rotary movement takes place therebetween.

It will be appreciated from the foregoing that when clamp screw 42 is turned in tapped hole 41 it moves toward or away from the swivel arm, depending upon the direction of rotation of said screw. When it is turned in one direction it will bear tightly against the swivel arm and cause said swivel arm to bear tightly against circular boss 40. A clamping action thereby takes place which prevents angular movement of said swivel arm relative to said boss and hence relative to the miter box base as a whole. When the screw is turned in the opposite direction the effect is to release the swivel arm for angular movement.

Handle 44 is the means by which the screw is turned in either direction. This handle has a hole 47 formed therein to accommodate the larger portion 43 of clamp screw 42. The fit between the handle and the screw is a relatively loose one to enable the handle to move rotatably or axially relative to the screw. An annular boss 48 is formed on the bottom of handle 44, concentrically with the hole formed therein and hence with screw 42. A plurality of radially extending notches 49 is formed in said annular boss to accommodate a pin 50 which is affixed to screw 42, radially thereof. When any one of the several notches 49 is in engagement with pin 50, relative angular movement between the handle and the screw is prevented. It is thus possible to actuate the screw by simply turning the handle. When it is desired to change the position of the handle relative to the screw, the handle is raised slightly on the screw until its notched boss is out of engagement with pin 50. The handle is then swung to another position on the screw and it is then again lowered until a different one of its notches engages pin 50. It is by this means that the clamping action on swivel arm 45 may be adjusted.

Swivel arm 45 is shaped in the form of a sector and more especially, in the preferred embodiment of this invention, in the form of a quadrant. Its leading or peripheral edge is marked off by means of calibrations 55. These calibrations extend radially of the swivel arm and they are spaced in accordance with a predetermined plan to mark off every degree or every five degrees of a total of ninety degrees. In the preferred form of this invention every five degrees are marked off by means of calibrations 55. It will be noted in Figs. 1, 2 and 3 that base 10 has a forwardly projecting extension 56 immediately forward of swivel arm 45. There is an opening 57 in the front of the base, immediately behind and above forwardly projecting extension 56. It is through this opening that the swivel arm projects to reach said forwardly extending extension 56. Adjustably mounted on top of extension 56 by means of screws 58 is a dial 59, calibrated in individual degrees. Its calibrations 60 cover an angular extension of nine degrees with reference to the vertical pivot on which swivel arm 45 swings. It will be understood therefore that this dial 59 performs in the manner of a vernier with respect to the calibrations on the swivel arm. It is by means of this dial 59 that the swivel arm 45 may be set at any angular position, accurate to a single degree, about its vertical pivot. Dial 59 serves not merely as an indicator cooperating with the calibrations on the swivel arm; it also serves as the means for accurately setting the main dial on said swivel arm. When it is desired to set the dial on the swivel arm, and hence the swivel arm itself, the saw is placed in the saw guides and a square is applied to said saw and to one of the back rests of the base of the miter box. When the square abuts the saw and the back rest, dial 59 is moved until its centermost calibration is accurately aligned with the centermost or "0" calibration on the swivel arm dial. The saw guides are now positioned for cutting an accurate 90° angle and both dials are accurately set in all of their calibrations.

It will be noted especially in Fig. 3 that a vertically extending end piece 65 is formed at the back end of swivel arm 45. A substantially V-shaped cut-out 66 is formed at the top of said vertical end piece 65, thereby providing a pair of edges 67 and 68 respectively which serve as indicators for dials 70 and 71 respectively which relate to the angular movement of the saw guides about their horizontal pivot. These two dials are adjustably attached to rear swivel member 72 by means of adjusting screws 73. It will be noted that these dials 70 and 71 are set into an annular groove or recess 75 and that they are adjustably positionable in angular relation to the center point of said swivel member 72. A radial cut-out 76 is provided at the top of said swivel member to provide clearance for the saw. A centrally and horizontally extending screw 78 attaches said swivel member 72 to the end piece 65 of swivel arm 45. A tapped hole 79 is provided in said end piece, in horizontal and radial relation to vertically extending screw 42 to receive said horizontally extending screw 78. Like screw 42, screw 78 has an enlarged portion 80 which abuts or bears up against the back of swivel member 72. Actually a washer 81 which may be of the lock washer type is interposed between the enlarged end 80 of screw 78 and the back of said swivel member 72. When the screw is turned tightly into its said tapped hole 79 it causes swivel member 72 to bear tightly against the vertical end piece 65 of swivel arm 45 and thereby clamps said swivel member in any desired position angularly of said screw member 78. It will appear from the foregoing that said horizontal screw member 78 serves as the horizontal pivot of the miter box in the same manner as the vertical screw 42 serves as its vertical pivot. And in the same manner that screw 42 serves to clamp swivel arm 45 in any position angularly of said screw, screw 78 serves to clamp swivel member 72 in any position angularly of said screw 78. It will be evident therefore that these screws function not only as pivots for the miter box but also as the clamps for said pivots. A cross rod 83, slidably mounted in screw 78, constitutes the handle by which said screw may be actuated to loosen or tighten it.

Back swivel 72 supports a pair of rod uprights 85 which are parallel to each other, being held in such parallel relationship by means of a cap piece 86. Saw guides 90 and 91 respectively are slidably mounted on said rods, so that they may be raised or lowered at will. It will be seen in Fig. 3 that these saw guides are adapted to accommodate a miter saw between them and it will be understood that these saw guides are free to descend along their respective rod uprights as the saw itself descends in cutting through the work. To prevent the saw guides from moving downwardly when a hand saw having a tapered back is used, a thumb screw 93 is provided in one of said saw guides for engagement with the upright on which said saw guide rides. A depth gauge or stop 95 may also be provided on one of said uprights to limit the downward movement of the saw guides when a miter saw is used. This stop gauge may comprise a collar on said upright and a thumb screw 96 carried by said collar for engagement with said upright. Calibrations 97 may be provided on said upright to measure the depth of the cut.

Saw guides 90 and 91 are similar to each other except that one is a left hand member and the other is a right hand member. Each comprises a horizontally extending arm 100 having a vertically extending saw guiding portion 101 at its forward end and a vertically extending saw guiding portion 102 at its back end. Saw guiding portions 102 are provided with spaced, laterally extending ears or lugs 103, 104, 105 and 106 respectively. These ears have vertically extending holes formed therein to accommodate rods 85 and it is by means of these ears that the saw guides are slidably mounted on said rods. It will be noted in Fig. 2 that thumb screw 93 aforementioned is screwed into ear 103, although it may equally as well be connected to any of the other ears. Reference to Fig. 2 will disclose the fact that saw guiding portions 101 are each provided with a pad 110 and a cut-out 111 above the pad. The cut-outs of the two guiding portions 101 register with each other to provide a track for the back of the miter saw. Pads 110 are the saw guiding portions proper which engage the sides of the blade of the saw and prevent the saw from tilting in uncontrolled fashion. Saw guiding portions 102 are also provided with similar pads and cut-outs for the same purpose. Pins or screws 115 hold the two saw guides together.

It will be understood from the foregoing that the saw guide which the several saw guiding elements comprise, controls the saw at two spaced points, one being situated rearwardly of the backrests and the other being situated adjacent the front of the miter box space. Adequate control of the saw is thereby provided and yet there is little or no interference or conflict between the saw guide and the work. The saw guide of the present invention is of the open-front type, well adapted for cutting boards of any length, limited only by the effective length of the saw. Furthermore this saw guide exposes the blade of the saw for a considerable distance, and the full width of the blade is available for cutting purposes.

Dials 70 and 71 are arcuate in shape and they are movable in their arcuate groove 75 about the center point or axis of back swivel member 72. In cooperation with the edges 67 and 68 of the back piece of swivel arm 45, which serve as indicators relative thereto, they serve as the dial means for setting the saw guide and hence the saw about the horizontal pivot of the miter box. These dials are independently adjustable and they may be accurately set in substantially the same manner as the dials relative to the vertical pivot may be set. A square is placed against the saw and against the table of the miter box and when its two arms squarely abut the table and the saw, the dials 70 and 71 should be positioned so that their "0" calibrations are in perfect alignment with indicating edges 67 and 68 respectively of the back piece of swivel arm 45. The "0" reading on the two dials now indicates that the saw guide and the saw are accurately positioned for an accurate 90° angle cut about the horizontal pivot of the miter box. All other angular readings on these two dials, whether the saw guide is swung downwardly and to the left or downwardly and to the right of the horizontal pivot, are equally accurate.

The miter box herein claimed is provided with a length gauge or stop 120 which includes a long, horizontally extending rod 121, and an adjustably secured bracket 122 on said rod and a shorter, horizontally extending rod 123 supported by said bracket. A pair of eye screws 125, extending through the back of the miter box base, support the long rod 121 in their respective eyes, and serve as clamps therefor. Actually said rod 121 is supported by the sides of the miter box base and by adjacent lugs 126. Registering holes are formed in the sides of the box and in said adjacent lugs and it is in these holes that said rod 121 is longitudinally movable. When it is desired to fix the position of said rod, longitudinally of itself and of the miter box base, wing nuts 127 on said eye screws or bolts are tightened thereon to cause the eyes of said screws or bolts to engage the rod tightly and thereby to prevent longitudinal movement of said rod. This movement of the eye screws or bolts is opposed by compression springs 128 and when wing nuts 127 are again loosened on said eye screws or bolts, the latter are moved back to their original positions by said compression springs 128. In their latter positions they free the bolt for longitudinal movement. Bracket 122 is adjustably positionable on said long rod 121 by means of thumb screw 130 and short rod 123 is adjustably positionable in said bracket by means of another thumb screw 131. Hence, these rods may be moved longitudinally of the miter box base, either individually or jointly. Rod 123 is the gauge proper and its function is to serve as a limiting stop for the work.

The foregoing is descriptive of a preferred form of this invention and it will be appreciated that other forms and modifications of the present form may be had within the broad scope of the invention. Among the important elements of this invention are the two screws which serve as the horizontal and vertical pivots of the miter box. They are not only the pivots of the miter box but they are also the means by which the saw guide of the miter box may be fixed in position about said pivots. It is unimportant whether these screws are themselves actuated to provide a clamping action or whether nuts on said screws are actuated for the same purpose. In the former case the miter box base and the swivel arm 45 serve as stationary nuts for said screws. In the latter case said base and said swivel arm would hold the screws immobile and nuts would be mounted on said screws.

Lever handle 44 is also illustrative of the different kinds of handle which may be used to actuate screw 42. The use of notches in the handle and a cross-pin in the screw to engage the notches is merely one way of effecting a positive engagement between the handle and the screw and yet providing for adjustably positioning said handle about said screw. Other means, such as a conventional set screw in the handle in engagement with the screw may be provided for the same purpose.

The saw guide herein claimed, although preferred, also constitutes an illustration of the different kinds of saw guide which may be employed in connection with the present miter box. The two swivels and their respective screw pivots and clamps will function equally as well with other types of saw guide. Other variations and modifications will be readily apparent to those skilled in the art.

Among the modifications and variations of which the present invention is susceptible are the following: It will be recalled that the dials on the horizontal pivot are adjustable relative to their respective indicators. It will serve the purposes of this invention equally as well to have the dials fixed and their indicators adjustable relative to them. And the same is true of the dial and indicator connected with the vertical pivot. In the drawing the dial is shown as fixed relative to the swivel arm and the indicator is shown as adjustable relative to said dial. An adjustable dial and a fixed indicator (and vernier) may be substituted for the fixed dial and the adjustable indicator (and vernier). If desired, the miter box may be provided with its vertical pivot only and not with its horizontal pivot. In such case it would constitute a conventional miter box in the sense of having only a vertical pivot but its construction would remain different from the prior art. The combination vertical pivot and screw clamp by which the swivel arm may be clamped in place about said pivot would be clearly advantageous in a single (vertical) pivot miter box. The specific type of saw guide which is shown in the drawing is also not critical insofar as the rest of the miter box is concerned. For example, it would be clearly possible to use any other kind of saw guide with the miter box as herein described and claimed. The saw guide as shown and described is, however, a preferred type of saw guide, well adapted to the purposes of the present miter box as well as to the purposes of conventional miter boxes.

I claim:

1. A miter box having a base with a horizontal work-supporting surface, a horizontal bearing surface formed on said base below said work supporting surface, a vertical clamp screw on said base extending through and below said bearing surface, a first swivel arm mounted on said vertical clamp screw for swivelling movement both to right and to the left on a horizontal plane, a horizontal bearing surface formed on said first swivel arm in facing relation to and for cooperation with the bearing surface on the base, clamping means on the clamp screw which is engageable with said first swivel arm for clamping said first swivel arm against the bearing surface on the base, a handle secured at one end to said clamping means and projecting outwardly from the base at its opposite end, whereby said handle may be moved in one direction to unclamp the clamping means from the first swivel arm to permit it to swivel and whereby said handle may be moved in the opposite direction to clamp said clamping means against the first swivel arm to prevent it from swiveling, a vertical bearing surface formed on the back of said first swivel arm, a horizontal clamp screw on said first swivel arm extending through and behind said vertical bearing surface, a second swivel arm mounted on said horizontal clamp screw for swivelling movement in both clockwise and counter-clockwise directions in a vertical plane to which said horizontal clamp screw is normal, a vertical bearing surface formed on said second swivel arm in facing relation to and for cooperation with the vertical bearing surface on the first swivel arm, clamping means on the horizontal clamp screw which is engageable with the second swivel arm for clamping said second swivel arm against the vertical bearing surface on the first swivel arm, a handle connected to the clamping means on the horizontal clamp screw for actuating said clamping means to tighten or loosen its clamping engagement with the second swivel arm and thereby to prevent or permit its swiveling movement, and a saw guide mounted at its back end on said second swivel arm and projecting forwardly across the work supporting surface of the base, said vertical clamp screw being in screw-threaded engagement with the base, the clamping means on said vertical clamp screw comprising a head at the lower end of the said screw which engages the first swivel arm to clamp it against the horizontal bearing surface of the base.

2. A miter box in accordance with claim 1, in which the horizontal bearing surface on the base comprises an annular boss which is concentric with the vertical clamp screw.

3. A miter box in accordance with claim 1, wherein the clamping means on the horizontal clamp screw comprises a head on said screw which is engageable with the back of the second swivel arm to clamp it against the vertical bearing surface on the first swivel arm.

4. A miter box in accordance with claim 1, wherein the second swivel arm is provided with arcuately arranged calibrations and the first swivel arm is provided with at least one indicator situated opposite and in cooperative relation to said calibrations to indicate the angular position of said second swivel arm relative to the first swivel arm.

5. A miter box in accordance with claim 1, wherein the first swivel arm includes a quadrant portion whose arcuate side is calibrated and projects forwardly from the base, an extension on said base projecting forwardly from said base and from said calibrated side of the quadrant, an indicator for said calibrated side of the quadrant being provided on said extension to indicate the angular positions of the first swivel arm about the axis of the vertical clamp screw, said indicator being also calibrated, the calibrations on the quadrant being relatively widely spaced equal angular distances of a plurality of degrees, the calibrations of the indicator being relatively narrowly spaced equal distances of one degree, whereby the calibrations on the indicator and quadrant may be cooperatively used to set the first swivel arm to any selected angular position about the axis of the vertical clamp screw, accurate to within one degree.

References Cited in the file of this patent

UNITED STATES PATENTS

| Number | Name | Date |
|---|---|---|
| 409,455 | Cowell | Aug. 20, 1889 |
| 434,134 | McMillan | Aug. 12, 1890 |
| 703,085 | Prentice | June 24, 1902 |
| 776,553 | Scoggins | Dec. 6, 1904 |
| 817,906 | Dunne | Apr. 17, 1906 |
| 818,275 | McCartney | Apr. 17, 1906 |
| 1,075,730 | Ross | Oct. 14, 1913 |
| 1,248,866 | Jacob | Dec. 4, 1917 |
| 1,522,913 | Schroeder | Jan. 13, 1925 |
| 1,638,011 | Grubbs | Aug. 9, 1927 |
| 1,653,386 | Beyland | Dec. 20, 1927 |
| 2,167,082 | Morris | July 25, 1939 |
| 2,408,801 | Miller | Oct. 8, 1946 |